United States Patent Office 3,000,446
Patented Sept. 19, 1961

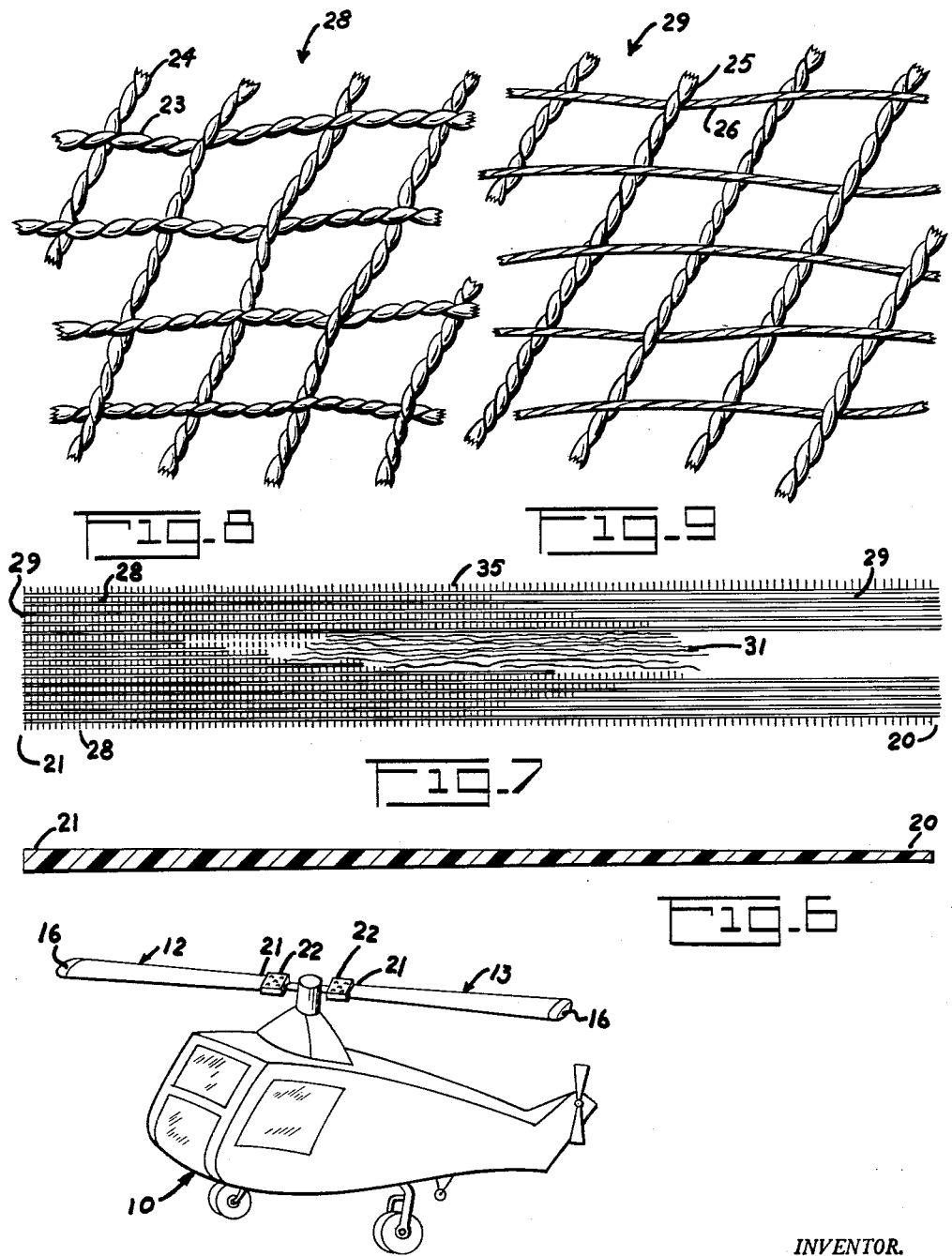

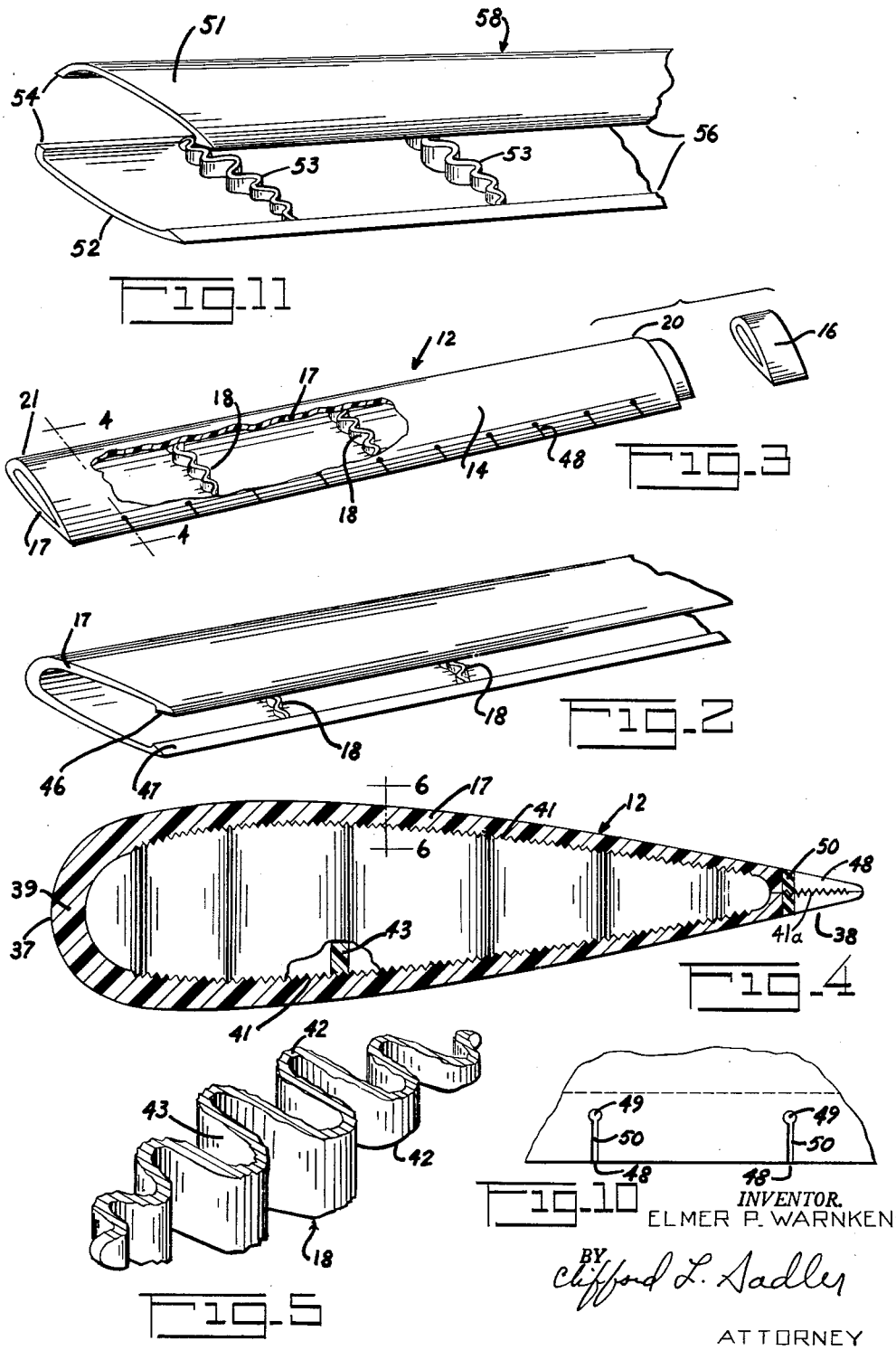

3,000,446
HELICOPTER ROTOR BLADES
Elmer P. Warnken, Cincinnati, Ohio, assignor to Studebaker-Packard Corporation, South Bend, Ind., a corporation of Michigan
Filed Aug. 25, 1958, Ser. No. 756,753
12 Claims. (Cl. 170—159)

This invention relates to rotor blades for aircraft and is more particularly directed to the construction of helicopter rotor blades employing reinforced plastic laminates.

Helicopter rotor blades are often hollow because of their large and extended sizes, and are therefore of a built-up construction of reinforcing ribs, skins, spars and the like, using semi-monocoque construction techniques. The blades must be so constructed as to be able to withstand centrifugal and moderate tangential loads, fatigue, trailing edge and tip flutter, and buckling on the compression side of the rotor during certain conditions of either starting or stopping the rotor blade in high winds and the like. There must also be certain resistance to environmental conditions such as resistance to water, rain, sand erosion, fungus, insects and rodents, and extremes in temperature and humidity as might be encountered from the tropics to arctic regions. Toward these ends the present invention is directed.

In view of the foregoing, it is therefore an object of this invention to provide a resin-impregnated laminated, hollow airfoil blade of large size suitable for use as a rotor blade on helicopters and the like.

Another object of this invention is to provide a hollow airfoil blade having relatively stiff skin areas in which outer layers of resin-impregnated fiber laminations are separated by filler of lightweight resin-impregnated fiber to form a rigid sandwich-type construction.

A further object of this invention is to provide a hollow airfoil blade having a skin and reinforcing ribs which are adhesively attached to the interior of the skin, each of the ribs being of serpentine shape including a series of portions which are substantially parallel to the axis of the blade, adjacent ends of the portions being joined by loop members.

It is also an object of this invention to provide a rotor blade having a skin in which certain of the laminations extend from the root end to the tip of the blade, these laminations being unidirectionally woven; i.e., formed of woven reinforcing cloth which is strongest in a direction span-wise of the blade, the unidirectionally woven laminations being loaded in tension during molding to prestress the blade.

A further object of this invention is to provide a rotor blade having bidirectionally woven reinforcing fibers extending part way from the root end of the blade toward the tip, the bidirectional fabric having substantially equal strength crosswise and lengthwise.

A still further object of this invention is to provide a helicopter blade having a face or exterior surface lamination formed of fine bidirectional glass fiber cloth, the face lamination being preloaded in compression.

Another object of the present invention is to provide a hollow rotor blade for a helicopter which tapers in thickness from its root to its tip. In addition to the taper of the blade as a whole, the skin thickness itself also tapers both from the leading edge to the trailing edge and from the root end to the tip end.

It is an additional object of the present invention to provide a hollow rotor blade for a helicopter having a skin of graduated density.

The above and other objects and advantages of this invention will become apparent from the following description and the accompanying drawings which form a part of this disclosure.

In the drawings:

FIGURE 1 is a perspective view showing a helicopter equipped with rotor blades constructed in accordance with an embodiment of this invention;

FIGURE 2 is a fragmentary perspective of one of the blades illustrated in FIGURE 1, the blade being partially constructed;

FIGURE 3 is an exploded perspective view of the blade illustrated in FIGURE 2, partially broken away and in section;

FIGURE 4 is a view in section taken on a line 4—4 in FIGURE 3;

FIGURE 5 is a perspective view showing a rib which forms a part of the blade;

FIGURE 6 is an exaggerated view in longitudinal section taken on line 6—6 in FIGURE 4, illustrating the taper of the skin span-wise of the blade;

FIGURE 7 is a longitudinal sectional view of the laminations of which the skin of the blade is formed, showing the arrangement of the laminations prior to molding of the skin with the vertical dimension or width of the laminations being exaggerated for purposes of illustration;

FIGURE 8 is an enlarged plan view illustrtating the bidirectional weave of one of the laminations;

FIGURE 9 is an enlarged plan view illustrating unidirectional weave of another of the laminations;

FIGURE 10 is an enlarged plan view of the trailing edge of the blade; and

FIGURE 11 is a fragmentary perspective view of a blade constructed in accordance with another embodiment of the invention, the blade being shown partially constructed.

Referring to the drawings wherein like reference numerals identify like parts, and particularly with reference to FIGURE 1, there is shown pictorially a helicopter 10 equipped with a pair of rotor blades 12 and 13, each similar in design and construction and forming a matched pair. For purposes of illustration only a single blade need be described herein. The blade 12 is of hollow, semi-monocoque construction and is generally formed of lightweight fiber glass plastic laminate formed in accordance with the invention embodied herein. The blade 12 as shown in FIGURE 3 includes a main portion 14, a cap 16 for the blade tip, and a cap or fixture 22 at the root end 21. The body 14 of the blade includes a skin 17 and a plurality of serpentine shaped ribs 18. The skin 17 and ribs 18 are preferably molded of reinforced laminations impregnated with a resin of the phenol-formaldehyde type. The skin 17 is molded to a shape as shown in FIGURE 2 of length and breadth dictated by aerodynamic considerations.

The blade skin 17 is of a generally U-shape and formed with a plurality of reinforced laminations employing glass fiber cloth and a filler such as fibrous asbestos. Glass fiber cloth includes two general types, as shown in FIG- URES 8 and 9, which are alternated in forming the laminations. The glass cloth 28 shown in FIGURE 8 includes woof and warp threads 23 and 24 of equal thickness and strength and which cross each other at substantially right angles. In the following description, such material will be referred to as bidirectional. FIGURE 9 shows a glass fabric 29 whose warp threads 25 are of high strength extending in one direction and held together in alignment by fill or woof threads 26 of substantially lesser strength, such fabric being hereafter referred to as unidirectional.

FIGURE 7 shows, on an exaggerated scale, the relative positions from root to tip of the fabric layers when laminated and the general location of the asbestos filler 31 which is embedded within the layers prior to the molding of the skin. The unidirectionally woven material 29 is indicated by double parallel lines, whereas bidirectionally woven material 28 is designated by a line of short vertical dashes. The woven fabrics 28 and 29 at the outer surface of the skin extend from root to tip, the internal layers vary in length and, together with a changing thicknesss of the asbestos filler 31 within the laminate, produce a skin 17 varying in thickness from root to tip. The filler 31 thickness is progressively varied to provide both the desired taper and a reduction in specific gravity, as it has a lower density than the glass laminates.

In the FIGURE 7 showing of the uncured laminate lay-up, the left hand end represents the root end 21 of the skin and the right hand end, the tip end 20. At the root end 21 of the skin, the laminate consists entirely of alternate layers of bidirectionally and unidirectionally woven glass fabric 28, 29. When molded, this provides a high strength end for attachment of the root fixture 22. Spaced some distance from the root end 21 the skin 17 becomes a sandwich structure with layers of lightweight asbestos filler 31 displacing the central laminates of glass cloth. The asbestos filler 31 extends into the region of the tip end 20. The layers of bidirectional material 28 extend from the root end 21 in varying lengths with a covering layer of facing material 35 being the only bidirectional fabric which extends the full span of the skin 17. The unidirectionally woven material 29 is also of varying length, but a substantial number of such laminations do extend the full length of the skin 17. Those unidirectionally woven laminations 29 which are continuous for the entire span of the blade are prestressed in longitudinal tension to approximately two hundred (200) pounds per square inch (p.s.i.). This prestressing of fabric 29 increases the rigidity and strength of the structure and when in combination with facing 35 results in a member having improved fatigue qualities because the facing lamination is placed in compression by the prestressing of fabric 29.

The filler 31, in addition to providing bulk to the sandwich structure for rigidity, provides a means of varying the density of the skin from the root of the blade 21 to the tip 20 so thaat the tapered skin 17 acts more nearly as a constant stress figure.

The laminations which form the blade 12, as previously stated, are resin-impregnated preferably with a phenol-formaldehyde type resin, the laminations being molded to the blade skin shape. FIGURE 6 shows the skin tapering from a relatively thick portion at the root end 21 to a relatively thinner portion at the tip 20, the diagram being exaggerated for the purpose of illustration. For a rotor blade in the order of 30 feet long, the taper may be from one-quarter (¼") inch thickness at the root end to one-eighth (⅛") inch thickness at the tip.

In addition to the span-wise taper, the skin 17 also has a chord-wise taper. FIGURE 4 shows the blade skin 17 to be of increased thickness at the leading edge 37, and progressively less in thickness toward the trailing edge 38. A greater mass of the blade is thus concentrated at the leading edge, additional laminations being applied thereto, this part thereby functioning both as a channel spar 39 and as a means for locating the center of mass of the blade at the quarter-chord point.

The ribs 18, as previously stated, are of generally serpentine form and have the shape of the internal profile of the blade as illustrated in FIGURE 4. The ribs 18 are preferably molded of resin-impregnated glass fiber material, of the bidirectionally woven type, and are serpentine in order to provide a substantially greater face area for adhesive attachment to the interior of the skin 17. Furthermore, the serpentine shape adds rigidity and increases the area of skin which is strengthened by each individual rib 18, and for this purpose are designed to have substantial portions extending span-wise of the blade as at 43.

Since the serpentine ribs 18 cover a greater projected area, they may be spaced at greater intervals insofar as center spacing is concerned, and still maintain the same spacing between the serpentine spaces as are necessary in a straight rib. Another advantage in the use of serpentine ribs is that the tendency toward buckling of the rib is decreased since the forces which tend to buckle are resolved in more directions and tendencies toward concentration of loads are reduced. The achievement of balance at the quarter-chord of the blade can be further accommodated by merely increasing the width of the ribs 18 in those areas which require additional weight and strength.

The blade 12 is fabricated by preforming the U-shaped skin 17 and serpentine ribs 18 as just described. The ribs 18 are inserted inside the skin 17 at predetermined locations, as shown in FIGURE 2, with adhesive applied to the peripheral edge thereof. The trailing edges of the skin 17 are then adhesively secured together causing the ribs 18 to adhere to the interior of the skin 17. Cementing lands 46 and 47 are provided at the trailing edge of the skin 17 to assure a good bonding area. The lands 46 and 47 also constitute flanges to facilitate strengthening the trailing edge. The adhesive utilized may be any suitable resin-cement capable of joining resin surfaces rigidly and permanently together.

Referring to FIGURES 4 and 5, there may be provided along the inner surface of the skin 17 small sawtooth corrugations 41 extending span-wise which engage or interlock with complementary corrugations 42 on the edges of ribs 18. This engagement increases the mechanical rigidity of the assembled structure. Corrugations 41a may also be provided along the matching faces of land 46 and 47 to produce a greater bonding area.

Subsequently the cap 16 is attached to the blade end 20 by appropriate means to form the tip, the cap 16 being of durable and lightweight metal. The end of the blade 20 is purposely undercut to receive the cap 16 in slidable engagement. The root end 21 of the blade 12 is attached to a root-holding cap 22 by means of rivets, screws, or the like. The root cap 22 forms a connecting member for the transmission of forces from the blade 12 to the hub of the helicopter's propeller shaft.

FIGURE 10 shows at the trailing edge of the blade a plurality of spaced slots 48 extending inward from the trailing edge and partially toward the leading edge, the slots 48 being in a vertical plane perpendicular to the trailing edge. The purpose of the slots 48 is to relieve the compression in the trailing edge during the operation of the blade, and the tendency of the edge to buckle. The inner ends of the slots are expanded as shown at 49. The slots 48 may be filled with inserts 50 made of rubber or rubber-like materials which conform to the shape of the slots. The slots 48 terminate where the edges 46 and 47 are adhesively attached together and short of the hollow interior of the blade 12. The actual depth of the slots 48 is made sufficient to substantially eliminate the tendency of the relatively thin plastic material to buckle when the trailing edge is loaded in compression and is such that the blade thickness at the slot inner end 49 has sufficient strength to prevent buckling. The rubber-like material 50 in the slots 48 may also be compressed as the trailing edges become flexed due to the compressive straining of the blade. The width of the slots is such as to take up the flexing.

FIGURE 11 shows a hollow blade 58 having a bipartite skin constructed in accordance with another embodiment of the invention. There is shown a blade formed from two complementary pieces, skin halves 51 and 52, each molded separately and taking on the general form or shape of one-half of the U-shaped skin shown in FIGURE 2. Serpentine ribs 53 of the type shown in FIGURE 5 are adhesively secured to the inner face of one of the skins with the other skin subsequently cemented in place to close the structure, the leading edges 54 and trailing edges 56 having cementing surfaces to facilitate closure.

Blade 58 may be characterized by the same construction features as blade 12 of FIGURE 3; that is, serpentine ribs, an end tip cap, a slotted trailing edge, a built-up leading edge for strength and quarter-chord balance, a skin member having a taper both span-wise and chord-wise as well as a varying density.

Other modifications will be apparent to those skilled in the art which will become within the scope and spirit of this invention as above described and as defined in the following claims.

I claim:

1. A hollow, plastic, rotor blade body having span-wise a root end, a tip end and a general taper from said root end to said tip end and having chord-wise the profile of an airfoil with a leading face and a trailing edge, said body comprising: top and bottom skin portions each extending from said root end to said tip end and from said leading face to said trailing edge, the thickness of each of said skin portions tapering from the root end to the tip end thereof and from the leading face to the trailing edge thereof, each skin portion comprising top and bottom, resin impregnated, cover layers of bidirectional reinforcement fabric extending from the root end to the tip end thereof and in between said cover layers resin impregnated layers of unidirectional fabric extending from said root end to said tip end with the warp threads being spanwise positioned and under static tension, the root end region of each skin portion comprising resin impregnated laminates in the form of alternate layers of unidirectionally woven reinforcement fabric and bidirectionally woven reinforcement fabric of varying lengths from said root end, and the intermediate region of each skin portion between the root end region and the tip end region comprising a resin impregnated filler material of density less than said fabrics and positioned sandwich fashion between said layers of unidirectional fabric extending from said root end to said tip end, the concentration of said filler material in said intermediate region decreasing towards said tip end region, said unidirectional and bidirectional fabric layers and said filler material providing said skin portion with a graduated decrease in thickness from said root end to said tip end thereof, said skin portions being joined together at said trailing edge and at said leading face; and rib means disposed chord-wise in said body between said skin portions and joined to said skin portions.

2. A rotor blade body according to claim 1 wherein each of said rib means comprises resin impregnated bi-directional fabric in a serpentine configuration whereby substantial portions of said rib means are disposed span-wise.

3. A rotor blade body according to claim 1 wherein the inner sides of said skin portions are longitudinally corrugated and said rib means are correspondingly corrugated.

4. A rotor blade body according to claim 1 wherein said skin portions are integral at the leading face of said body and are joined together by an adhesive at the trailing edge of said body.

5. A rotor blade body according to claim 4 wherein each skin portion in the region of the leading face thereof comprises additional layers of resin impregnated reinforcement fabric.

6. A rotor blade body according to claim 1 wherein the inner sides of said skin portions in the region of said trailing edge comprise cementing lands.

7. A rotor blade body according to claim 6 wherein the matching faces of said lands comprise longitudinally disposed corrugations.

8. A rotor blade body according to claim 1 wherein the trailing edge of each skin portion comprises transversely disposed slots.

9. A rotor blade body according to claim 8 wherein the inner ends of said slots are expanded.

10. A rotor blade body according to claim 8 wherein said slots are filled with a rubber-like material.

11. A hollow, plastic, rotor blade body having span-wise a root end, a tip end and a general taper from said root end to said tip end and having chord-wise the profile of an airfoil with a leading face and a trailing edge, said body comprising: top and bottom skin portions each extending from said root end to said tip end and from said leading face to said trailing edge, the thickness of each of said skin portions tapering from the root end to the tip end thereof, each skin portion comprising top and bottom, resin impregnated, cover layers of bidirectional reinforcement fabric extending from the root end to the tip end thereof and in between said cover layers resin impregnated layers of unidirectional fabric extending from said root end to said tip end with the warp threads being span-wise positioned and under static tension, the root end region of each skin portion comprising resin impregnated laminates in the form of alternate layers of unidirectionally woven reinforcement fabric and bidirectionally woven reinforcement fabric of varying lengths from said root end, and the intermediate region of each skin portion between the root end region and the tip end region comprising a resin impregnated filler material of density less than said fabrics and positioned sandwich fashion between said layers of unidirectional fabric extending from said root end to said tip end, the concentration of said filler material in said intermediate region decreasing towards said tip end region, said unidirectional and bidirectional fabric layers and said filler material providing said skin portion with a graduated decrease in thickness from said root end to said tip end thereof, said skin portions being joined together at said trailing edge and at said leading face; and rib means disposed chord-wise in said body between said skin portions and joined to said skin portions.

12. A hollow, plastic, rotor blade body having span-wise a root end, a tip end and a general taper from said root end to said tip end and having chord-wise the profile of an airfoil with a leading face and a trailing edge, said body comprising: top and bottom skin portions each extending from said root end to said tip end and from said leading face to said trailing edge, the thickness of each of said skin portions tapering from the root end to the tip end thereof, each skin portion comprising top and bottom, resin impregnated, cover layers of bidirectional reinforcement fabric extending from the root end to the tip end thereof and in between said cover layers resin impregnated layers of unidirectional fabric extending from said root end to said tip end with the warp threads being span-wise positioned and under static tension, and the intermediate region of each skin portion between the root ends region and the tip end region comprising a resin impregnated filler material of density less then said fabrics and positioned sandwich fashion between said layers of unidirectional fabric extending from said root end to said tip end, the concentration of said filler material in said intermediate region decreasing towards said tip end region, said unidirectional and bidirectional fabric layers and said filler material providing said skin portion with a graduated decrease in thickness from said root end to said tip end thereof, said skin portions being joined together at said trailing edge and at said leading face; and rib means disposed chord-wise in said body between said skin portions and joined to said skin portions.

References Cited in the file of this patent

UNITED STATES PATENTS

| | | |
|---|---|---|
| 1,846,256 | Havill | Feb. 23, 1932 |
| 2,056,563 | Budd | Oct. 6, 1936 |
| 2,189,785 | Fahrney | Feb. 13, 1940 |
| 2,417,586 | Crosley | Mar. 18, 1947 |
| 2,428,325 | Collins | Sept. 30, 1947 |
| 2,482,798 | Rheinfrank | Sept. 27, 1949 |
| 2,485,827 | Hartzell | Oct. 25, 1949 |
| 2,566,701 | Griese | Sept. 4, 1951 |
| 2,588,570 | Pitcairn | Mar. 11, 1952 |
| 2,606,728 | Sikorsky | Aug. 12, 1952 |
| 2,630,868 | Ellenberger | Mar. 10, 1953 |

FOREIGN PATENTS

| | | |
|---|---|---|
| 148,796 | Great Britain | July 10, 1920 |